US011890255B2

(12) United States Patent
Younger

(10) Patent No.: US 11,890,255 B2
(45) Date of Patent: Feb. 6, 2024

(54) RECLINED CRUTCH

(71) Applicant: MOBILITY DESIGNED, INC., Kansas City, MO (US)

(72) Inventor: Max Jefferies Younger, Roeland Park, KS (US)

(73) Assignee: Mobility Designed, Inc., Kansas City, MO (US)

(*) Notice: Subject to any disclaimer, the term of this patent is extended or adjusted under 35 U.S.C. 154(b) by 0 days.

(21) Appl. No.: 17/305,811

(22) Filed: Jul. 14, 2021

(65) Prior Publication Data

US 2022/0015981 A1 Jan. 20, 2022

Related U.S. Application Data

(60) Provisional application No. 63/051,991, filed on Jul. 15, 2020.

(51) Int. Cl.
*A61H 3/02* (2006.01)
*A61H 3/00* (2006.01)

(52) U.S. Cl.
CPC ............. *A61H 3/02* (2013.01); *A61H 3/0288* (2013.01); *A61H 2003/006* (2013.01); *A61H 2003/0238* (2013.01); *A61H 2201/1664* (2013.01); *A61H 2201/1676* (2013.01)

(58) Field of Classification Search
CPC .............. A61H 3/02; A61H 2201/0161; A61H 2003/006; A61H 2003/0238
See application file for complete search history.

(56) References Cited

U.S. PATENT DOCUMENTS

| | | | | | |
|---|---|---|---|---|---|
| 2,516,852 | A * | 8/1950 | Burry | A61H 3/0244 | 135/71 |
| 2,575,681 | A * | 11/1951 | Peters | A61H 3/02 | 135/69 |
| 2,711,183 | A * | 6/1955 | Lofstrand, Jr. | A61H 3/02 | 135/69 |
| 2,811,978 | A * | 11/1957 | Martin | A61H 3/00 | 135/65 |
| 3,213,869 | A * | 10/1965 | Frank | A61H 3/02 | 135/71 |
| 3,635,233 | A | 1/1972 | Robertson | | |
| 3,710,807 | A * | 1/1973 | Ferry | A61H 3/02 | 135/71 |
| 4,151,853 | A | 5/1979 | Inbar | | |
| 4,869,280 | A * | 9/1989 | Ewing | A61H 3/02 | 135/69 |
| 5,711,334 | A | 1/1998 | Roux | | |
| 5,771,910 | A * | 6/1998 | Kluttz | A61H 3/02 | 135/72 |
| 7,503,337 | B1 * | 3/2009 | Morgan | A61H 3/0277 | 135/70 |

(Continued)

OTHER PUBLICATIONS

International Search Report and Written Opinion, dated Oct. 6, 2021, 11 pages, issued in PCT Application No. PCT/US2021/070879.

*Primary Examiner* — Noah Chandler Hawk
(74) *Attorney, Agent, or Firm* — AVEK IP, LLC

(57) ABSTRACT

A reclined forearm crutch includes a leg; and a cradle attached to the leg for supporting the forearm and elbow of a use. The cradle has a bounding surface area corresponding to at least 20 in$^2$. The cradle is angled about 5 to about 50 degrees relative to vertical.

15 Claims, 14 Drawing Sheets

(56) References Cited

U.S. PATENT DOCUMENTS

| | | | | |
|---|---|---|---|---|
| 2009/0235966 | A1* | 9/2009 | Birnbaum | A61H 3/0277 135/66 |
| 2016/0101012 | A1* | 4/2016 | Hsiao-Wecksler | A61H 3/02 135/71 |
| 2018/0021201 | A1 | 1/2018 | Varghese et al. | |
| 2019/0008715 | A1 | 1/2019 | Younger | |

* cited by examiner

RECLINED CRUTCH

CROSS-REFERENCE TO RELATED APPLICATIONS

This application claims the benefit of priority of U.S. Provisional Patent Application No. 63/051,991, filed Jul. 15, 2020, the entire disclosure of which is incorporated herein by reference.

FIELD OF THE INVENTION

This invention is directed to crutches. More specifically, this invention is directed towards forearm crutches and forearm crutches that may be optionally converted to a cane.

SUMMARY

The following presents a simplified summary of the invention in order to provide a basic understanding of some aspects of the invention. This summary is not an extensive overview of the invention. It is not intended to identify critical elements of the invention or to limit the scope of the invention. Its sole purpose is to present some concepts of the invention in a simplified form as a prelude to the more detailed description presented below.

In one embodiment, a reclined forearm crutch, having a leg, and a cradle attached to the leg for supporting the forearm and elbow of a user. The cradle having a bounding surface area corresponding to at least 20 int. The cradle is angled about 5 to about 50 degrees relative to vertical.

In aspects of the invention, the leg comprises a first section selectively coupled to a second section, the first section being substantially vertical and the second section being angled relative to vertical; and the cradle is attached to the second section and rests substantially adjacent the second section in the walking position.

In further aspects of the invention, the leg further comprises a third transitional section coupled between the first and second sections, the third section having a bend causing the second section to be angled.

In still further aspects of the invention, the cradle is hingedly attached to the leg; the cradle is selectively adjustable between a walking position and a non-walking position; and in the non-walking position, the cradle is selectively free-rotating.

According to aspects of the invention, the cradle has a handle extending therefrom, and is further selectively lockable in a substantially horizontal position between 5 and 12 degrees relative to horizontal to enable a platform walking position.

In some aspects, the cradle further comprises a clip; and the clip secures the cradle to the second section in the walking position.

In further aspects, the second section is configured to selectively decouple from the first section and rotate about a pivot point at a top end of the first section such that a top surface of the cradle rests substantially adjacent the first section, whereby the forearm crutch is reconfigured for use as a cane.

According to yet another aspect, the pivot point comprises a point of connection between the first section and the second section. The point of connection may be a string or a hinge.

According to still yet another aspect, a length of the second section is adjustable based on the length of the user's forearm.

In a further aspect, an angle of the cradle in the walking position is about 8 to about 35 degrees relative to vertical.

In still a further aspect, the cradle comprises a plurality of apertures formed therein.

In another embodiment, a forearm crutch has a leg having respective first, second, and third sections, the first section being substantially vertically oriented, the second section being angularly oriented, and the third section being coupled between the first and second sections; a cradle hingedly attached to the second section, the cradle being configured to rotate about the hinge between a use-position and a free-rotating position, wherein the cradle rests substantially adjacent the second section in the use position; and a handle extending from the leg.

According to aspects of the invention, the second section is configured to selectively decouple from the third section and rotate about a pivot point at a top end of the third section such that a top surface of the cradle rests substantially adjacent the first section, whereby the forearm crutch is reconfigured for use as a cane.

In further aspects, the pivot point comprises a point of connection between the second and third sections, the point of connection being a string or a hinge.

In still further aspects, the cradle comprises a plurality of apertures formed therein.

According to yet another aspect, the second section is angled about 35 degrees relative to vertical.

In still yet another aspect, the second section is a telescoping member.

In yet another embodiment, a forearm crutch includes a leg having respective first, second, and third sections, the first section being substantially vertically oriented, the second section being angularly oriented, and the third section between coupled between the first and second sections; a cradle hingedly attached to the second section, the cradle being configured to rotate about the hinge between a use-position and a free-rotating position, wherein the cradle rests substantially adjacent the second section in the use position; and a handle extending from the leg; The cradle further comprises a clip, the clip securing the cradle to the second section in the use position.

According to an aspect of the invention, the forearm crutch further comprises an interchangeable foot coupled to an end of the first section.

DETAILED DESCRIPTION

Figure 1:
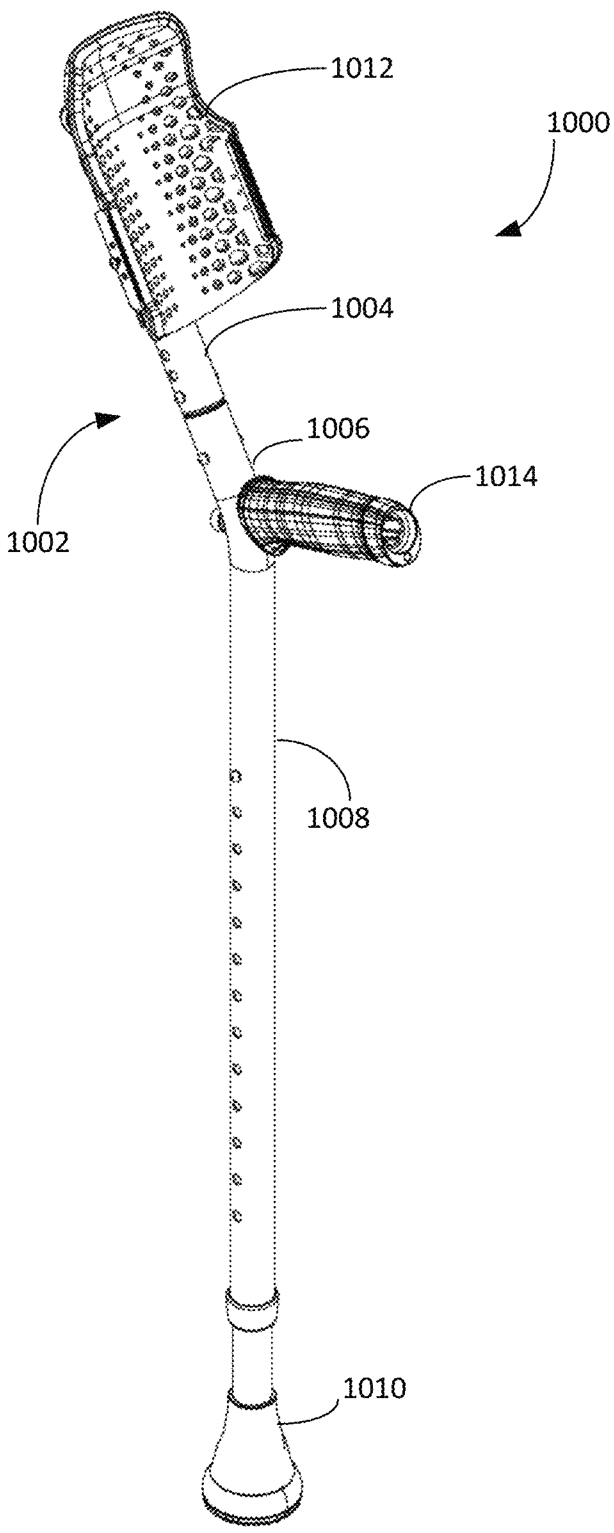
FIG. 1 is a front perspective view of a reclined crutch according to an embodiment of the invention.

Many traditional crutches or canes are designed to rest under the armpit of a user with handles near the user's side to support the weight of the user. These designs can be uncomfortable for the user, and are often not easy for users to operate, especially on uneven or inclined surfaces, such as stairs. In addition to cumbersome methods of operation, underarm crutches require a user to support most of his weight on his axilla, wrists, or hands. This can cause additional injuries to the user.

In some parts of the world, forearm crutches are more commonly used than underarm crutches. While forearm crutches address some of the disadvantages of underarm crutches by shifting the support of the user's weight from his hands, wrists, and axilla to his wrists and hands with the forearm acting as a brace, prior art designs still suffer several flaws. For example, traditional forearm crutches put over 90% of load forces on the user's hands and wrists. Axillary crutches put 100% of load forces on the user's hands and wrists when used correctly. Often, the angle of the cradle (or the supporting surface) of the forearm crutch is such that a meaningful amount of weight—albeit less than an underarm crutch—is supported by the user's hand and wrist when using the crutch rather than being fully, or substantially fully, supposed by the user's forearm.

According to embodiments of the invention, a reclined forearm crutch is described that is designed to support the user's weight at the user's elbow and forearm region such that the load forces on the user's hands and wrists are reduced to between about 5% (e.g., in a platform mode) and 65% (e.g., in a reclined forearm mode) thereby providing a safer and more comfortable solution for users. In embodiments, the pressure on the hands and wrists may be reduced by as much as 35-90% as compared to traditional forearm or axillary crutches.

Various embodiments of the invention are illustrated with reference to the figures, which show a forearm crutch 1000 generally having a leg 1002 and an arm support 1012. The leg 1002 has a first section 1008 that is substantially vertically straight, a second transitional section 1006, and a third section 1004. In some embodiments, the first, second, and third sections 1008, 1006, and 1004 are separate pieces secured together to form the leg 1002. Any means may be used to secure the sections 1008, 1006, and 1004 together. For example, one or more of the sections 1008, 1006, and 1004 may have a quick-release pin designed to mate with a hole formed in another of the sections 1008, 1006, 1004 as will be understood by those of skill in the art. In embodiments, the leg 1002 may be formed of a single piece of material, e.g., where the first section 1008, the second section 1006, and the third section 1004 are molded or otherwise formed together without a break between the sections 1008, 1006, and 1004. In embodiments, the first section 1008 and/or the third section 1004 may be telescoping members, allowing for an adjustment of the length of the respective member.

Figure 8A:
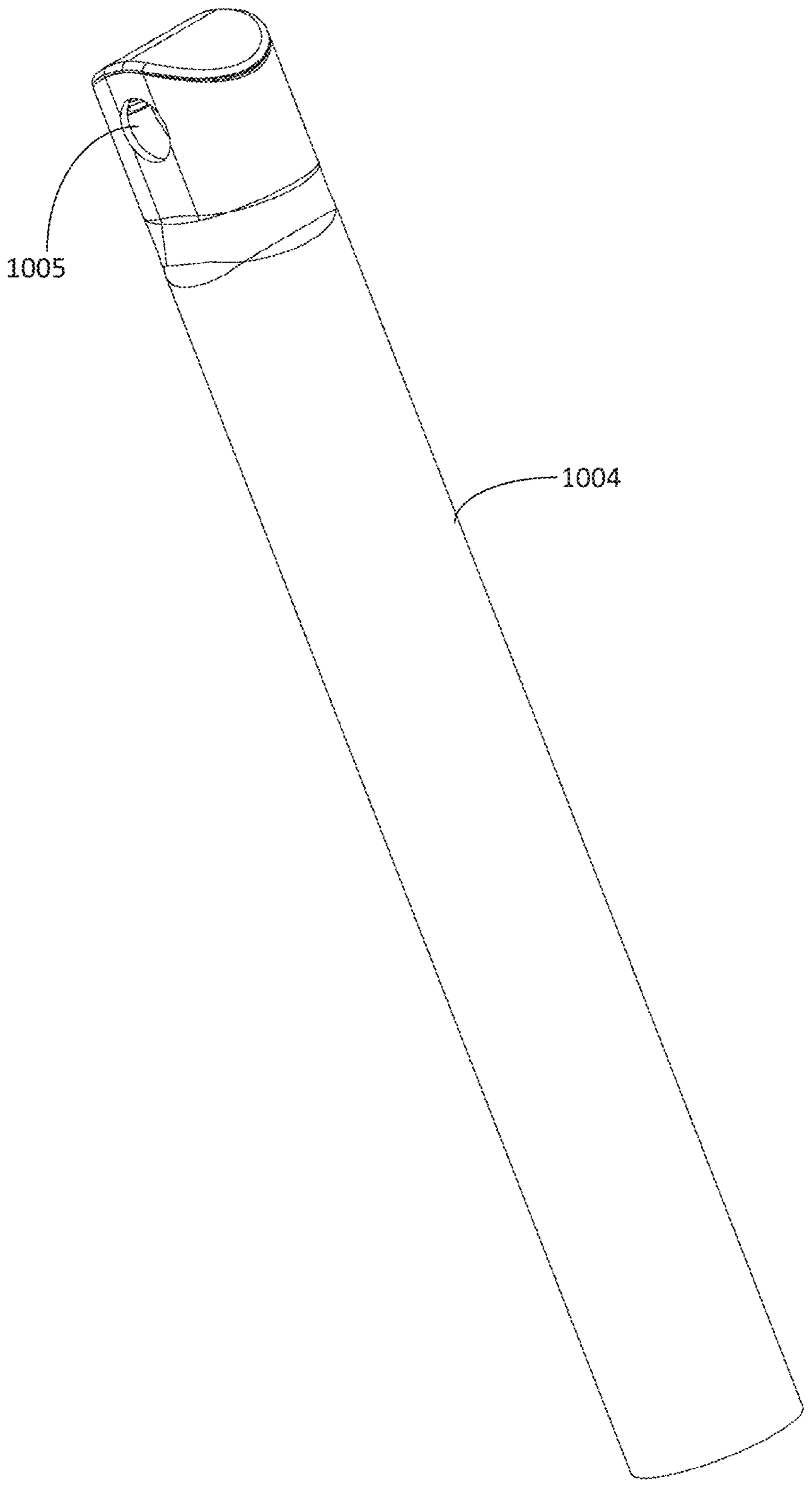
FIG. 8A is a close-up perspective view of the third section of the leg of the reclined crutch of FIG. 1.
Figure 8B:
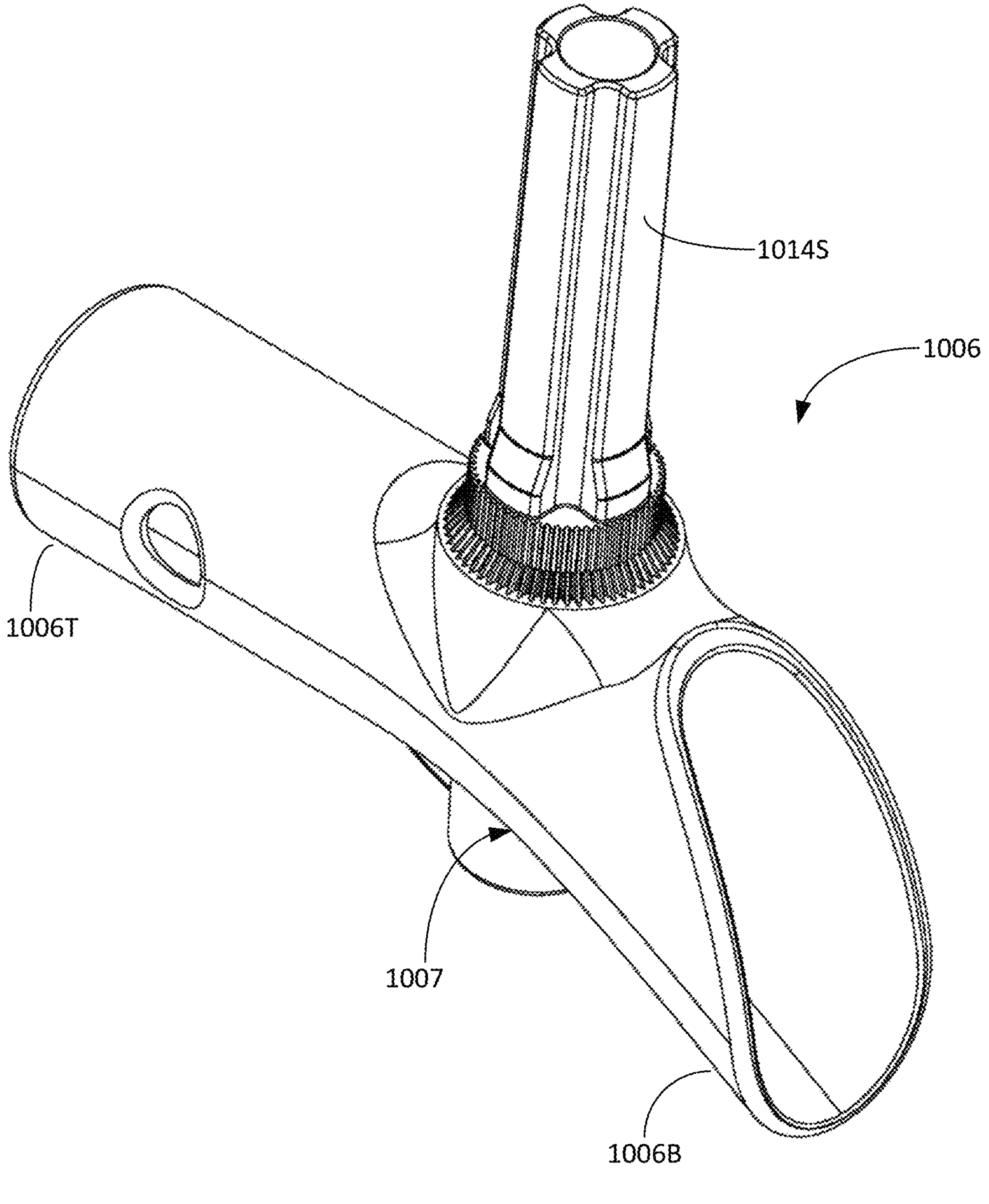
FIG. 8B is a close-up perspective view of the second section of the leg of the reclined crutch of FIG. 1.

The second transitional section 1006, more clearly shown in FIG. 8B, has a slight bend 1007. When situated between first section 1008 and the third section 1004, a bottom end 1006B of the second section 1006 receives the first section 1008 and maintains the substantially vertical orientation of the first section 1007. A top end 1006T of the second section 1006 receives the third section 1004 such that the third section 1004 is angled backwards (i.e., away from the handle shown in the figures) at an angle between 0 and 90 degrees.

Figure 2:
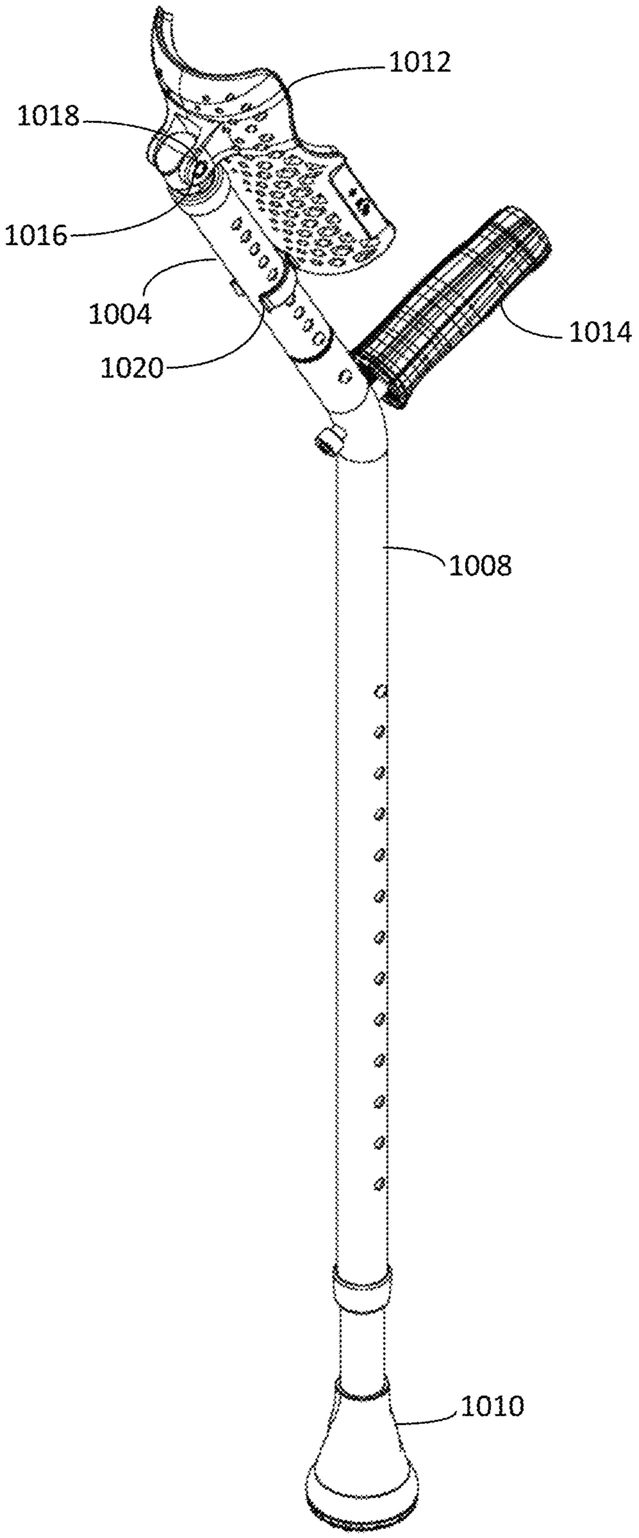
FIG. 2 is a rear perspective view of the reclined crutch of FIG. 1.
Figure 3:
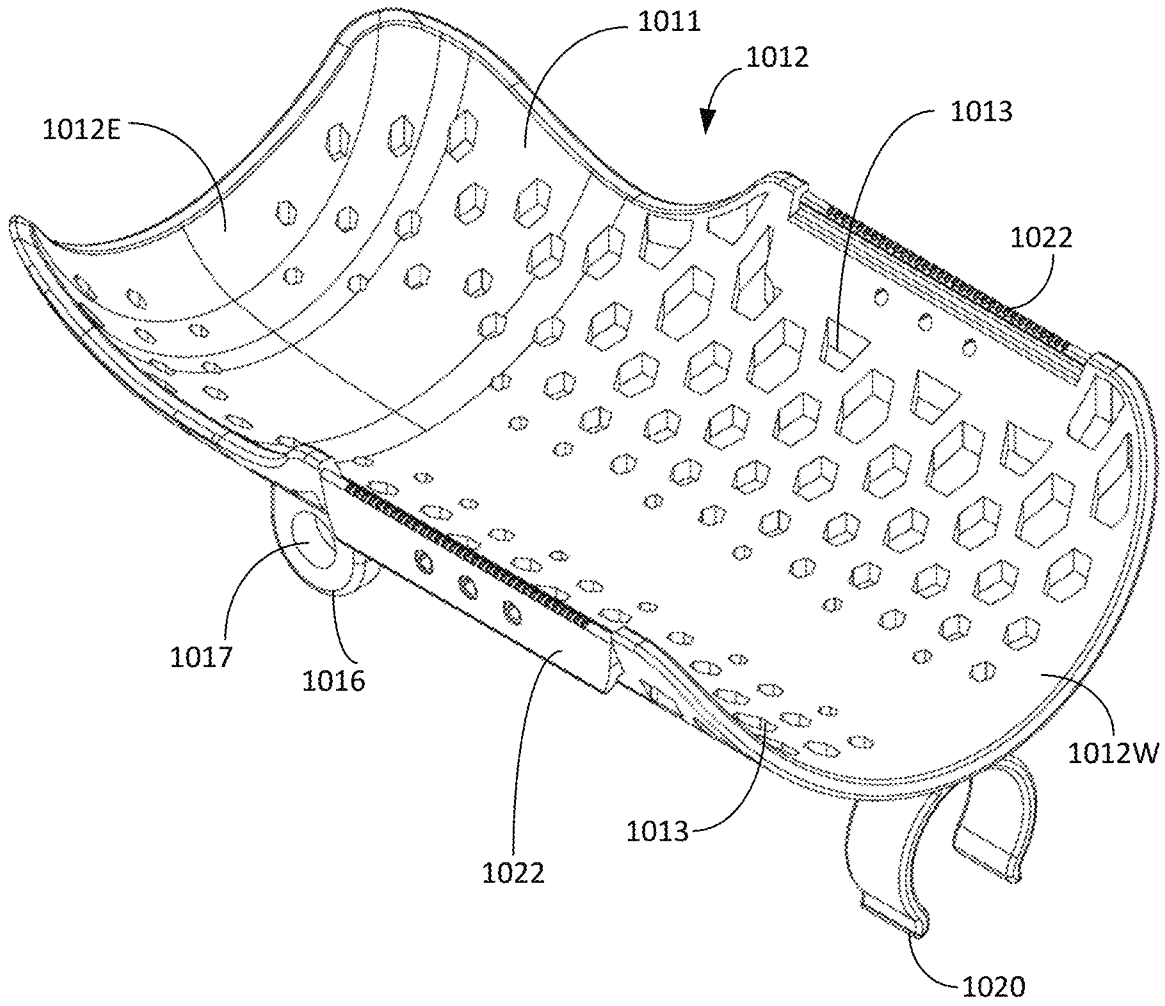
FIG. 3 is a top perspective view of an arm rest of the reclined crutch of FIG. 1.
Figure 4:
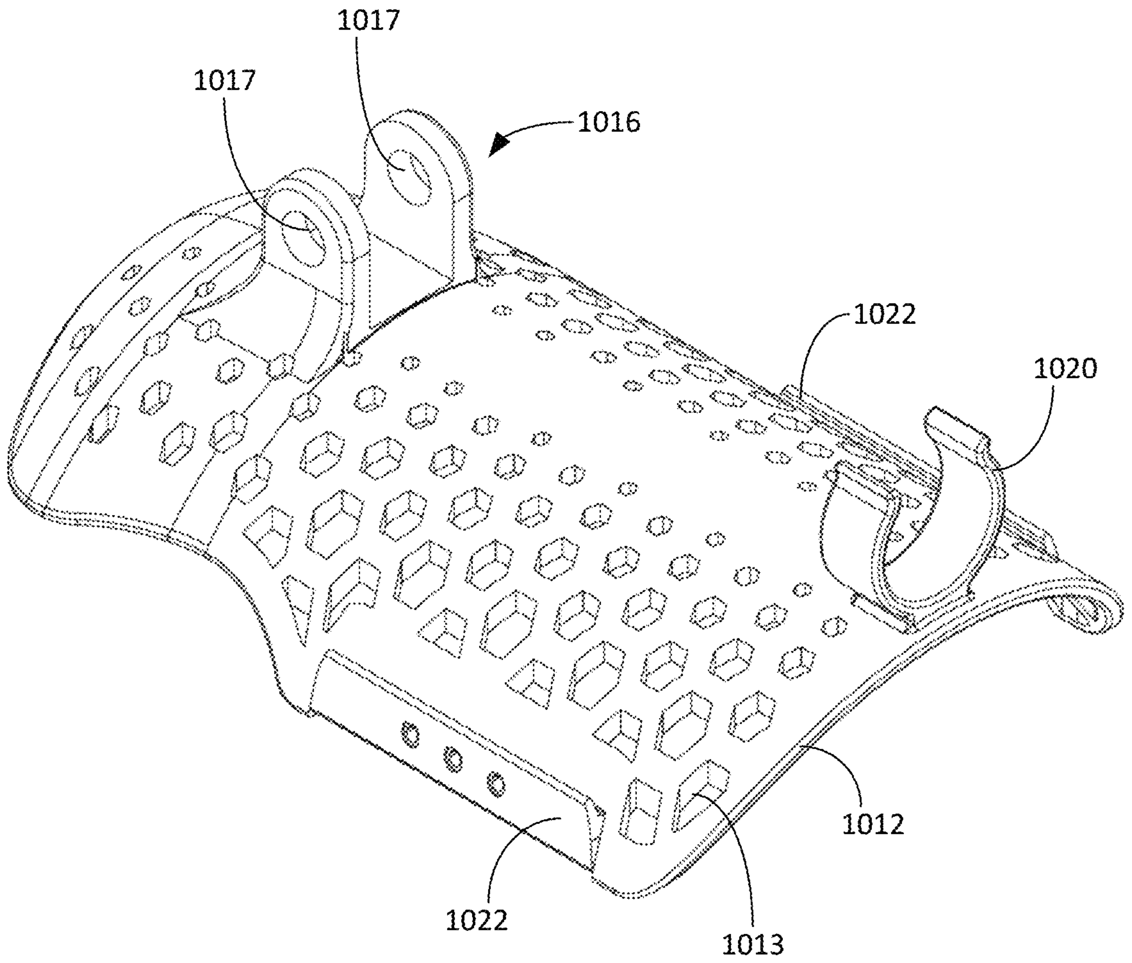
FIG. 4 is a bottom perspective view of the arm rest of FIG. 3.
Figure 10A:
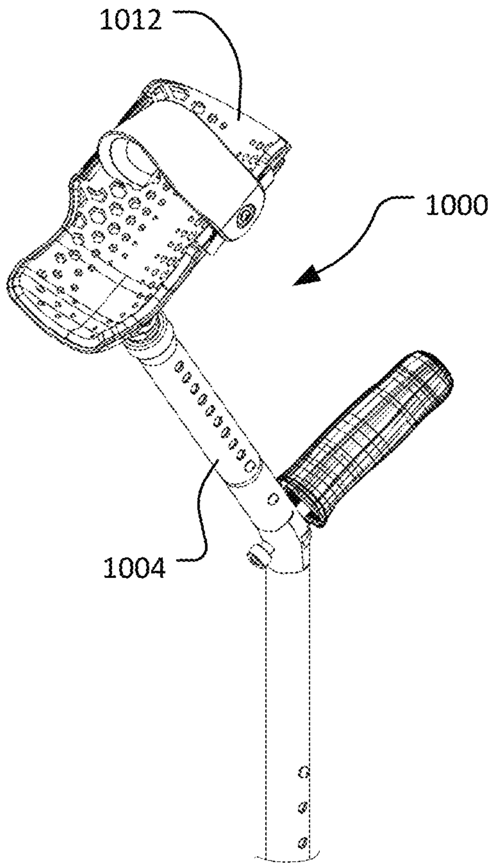
FIG. 10A is a perspective view of a portion of the crutch of FIG. 1 showing the arm rest in a horizontal position.
Figure 10B:
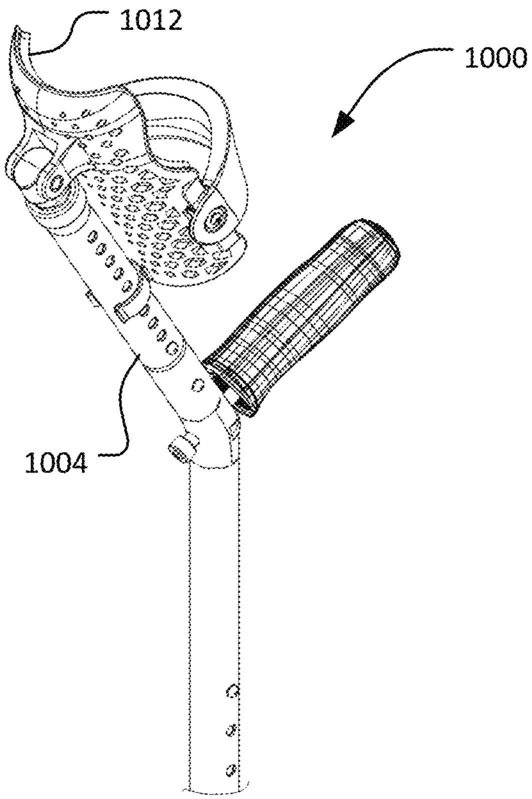
FIG. 10B is a perspective view of a portion of the crutch of FIG. 1 showing the arm rest resting against the leg of the crutch.

Moving on, arm support 1012 (also referred to as the cradle), is connected to the top of the third section 1004 and is configured to selectively rotate between a use position where the arm support 1012 rests against and is supported by the third section 1004 (FIG. 10A), and a substantially horizontal position where the arm support 1012 extends away from the third section 1004 (FIG. 10B). As shown in FIGS. 2-3, the arm support 1012 has a pivot assembly 1016 that allows the arm support 1012 to be hingedly connected to the third section 1004. Apertures 1017 in the pivot assembly 1016 are aligned with an opening 1005 in a top end of the third section 1004. A pin 1018 is then inserted through the apertures 1017 and the opening 1005 to secure the arm support 1012 to the third section 1004. The arm support 1012 can thus selectively rotate about the pin 1018 between the substantially horizontal position and the substantially vertical position.

In embodiments, the arm support 1012 may be free-rotating to allow the user the user to move his arms without requiring the user to decouple from the crutch 1000. In other words, the arm support 1012 may rotate about 180° (e.g., from the substantially vertical position where the cradle 1012 rests against the third section 1004 to a substantially vertical position where the cradle 1012 extends away from the top of the third section 1004.

The arm support 1012 may be locked into the horizontal position such that the user may place his forearm on the arm support 1012, shifting at least some of his weight to the crutch 1000. A user may desire to rotate the arm support 1012 into the horizontal position when the user is resting (i.e., not moving). The user may thus rest against the crutch 1000 without placing any force on his hands/wrists or underarm. The lock may be selectively released by the user to rotate the cradle 1012 back into the use position. In embodiments, an over-center locking mechanism may be utilized to lock the cradle 1012 in the horizontal position. In some embodiments, the cradle 1012 may be equipped with corresponding openings on an underside thereof for receiving the third portion 1004 of the leg 1002, such as shown and described in U.S. Patent Publication No. 2021/0145688, which is incorporated by reference herein in its entirety. The respective openings may allow the user to selectively alternate between the use-position and the substantially horizontal position as desired.

As shown in the figures, a clip 1020 may be secured to the underside of the cradle 1012 to engage with the third section 1004 of the leg 1002 thus maintaining the cradle 1012 in position against the third section 1004. A friction fit between the clip 1020 and the third section 1004 of the leg 1002 may allow the cradle 1012 to stay in position until the user pulls the cradle 1012 from engagement with the third section 1004, and reorients the cradle into the substantially horizontal position, where the cradle 1012 may be locked as described above. In embodiments, the clip 1020 may be an over-center locking mechanism to connect the cradle 1012 to the third section 1004 of the leg 1002.

Referring now specifically to the surface of the cradle 1012, the cradle 1012 is designed to provide support for a user's elbow and forearm. Importantly, when the weight of a user is shifted from his wrists to his forearms, and more particularly to his elbows, use of the crutch becomes more manageable due to the decreased pressure on the hands and wrists and increased stability experienced by the user, and therefore the crutch is more comfortable. This is especially true for long-time users that rely on crutches for everyday movement. Furthermore, the likelihood of further injury to the user due to the use of crutches can be minimized. The cradle 1012 has an elbow end 1012E and a wrist end 1012W, and a curved surface to support the user's forearm. The cradle 1012 may have a surface area that corresponds to at least, and preferably more than, about 20% of the surface area of an underside of a user's forearm.

In some embodiments, the cradle 1012 may be formed having a plurality of holes 1013. There may be no holes formed in the center of the cradle 1012 (e.g., the contact surface area where the underside of the forearm touches the cradle 1012), where maximum support is needed for the user. However, the holes 1013 may increase in size and quantity from the center of the cradle 1012 outwards. The holes 1013 may allow for an overall reduction in the weight of the crutch 1000. Additionally, the holes 1013 allow for airflow, which may result in a more pleasant experience for the user, specifically by keeping the user's skin dry and reducing the risk of decubitus ulcers.

In embodiments, a bounding surface area of the cradle 1012 (i.e., the surface area absent holes 1013) corresponds to at least 20 $in^2$. To the contrary, the forearm cuff of traditional forearm crutches have a bounded surface area of about 15.4 $in^2$. Increasing the bounding surface area of the cradle 1012 ensures a more comfortable fit, and allows more force to be transferred away from the user's hands and wrists.

In order to provide the necessary elbow support without sacrificing ease of use, the cradle 1012 must be strong yet flexible and light. In embodiments, the cradle 1012 is formed of a material that provides the strength necessary to support a user, such as a polycarbonate, polyethylene, polyvinyl chloride, polypropylene, nylon, or any other material that satisfies the requirements of strength, comfort, and flexibility while maintaining a lightweight construct.

In embodiments, the cradle 1012 may be provided with a cushion 1011. The cushion 1011 may be cut or molded and secured to the cradle 1012. The cushion 1011 can be formed from any appropriate cushion material, such as EVA for example. The cushion may have a plurality of corresponding holes such that, when mated with the cradle 1012, the holes in the cushion generally match with the holes 1013 in the cradle 1012.

Figure 5:
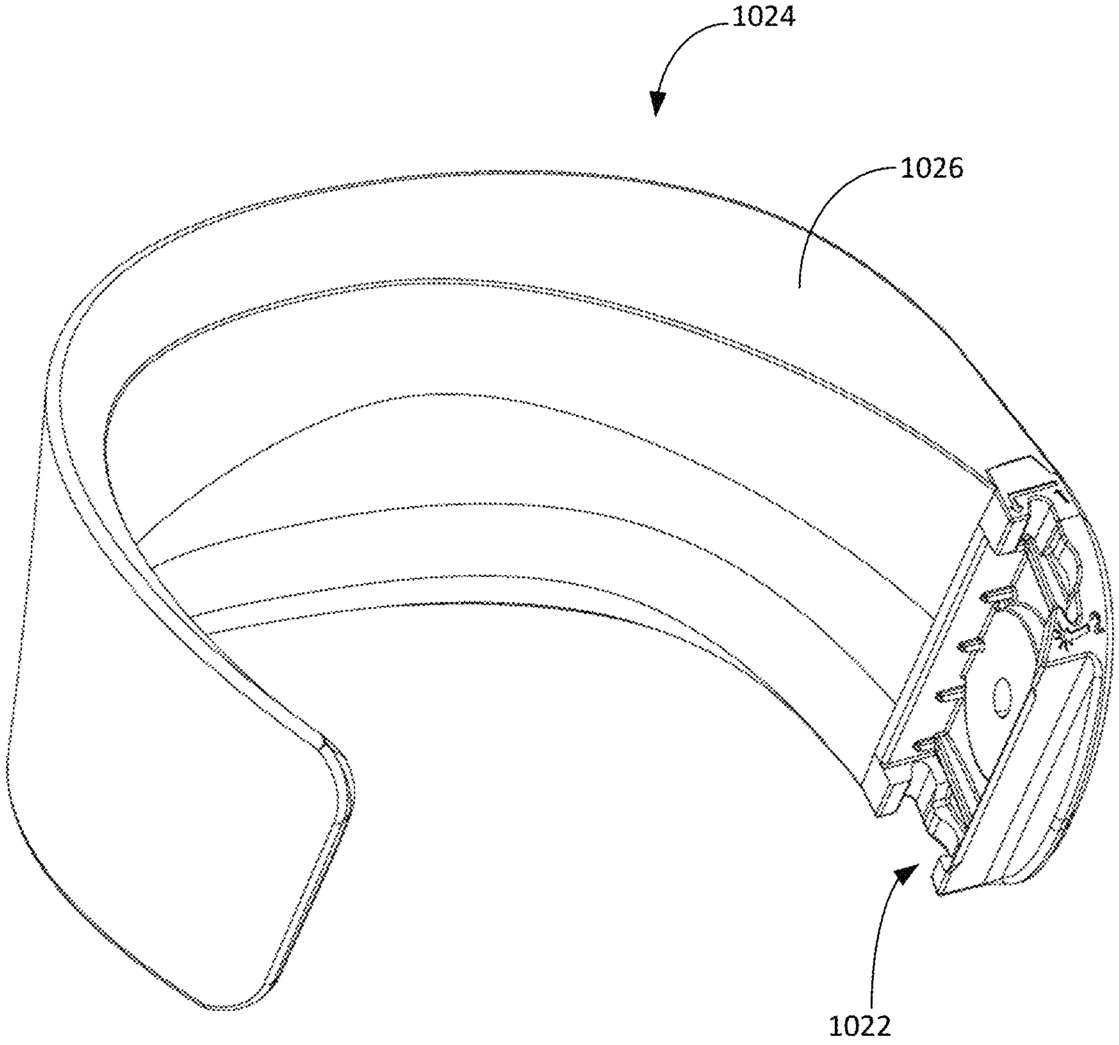
FIG. 5 is a bottom perspective view of an arm band of the arm rest of FIG. 1.
Figure 6:
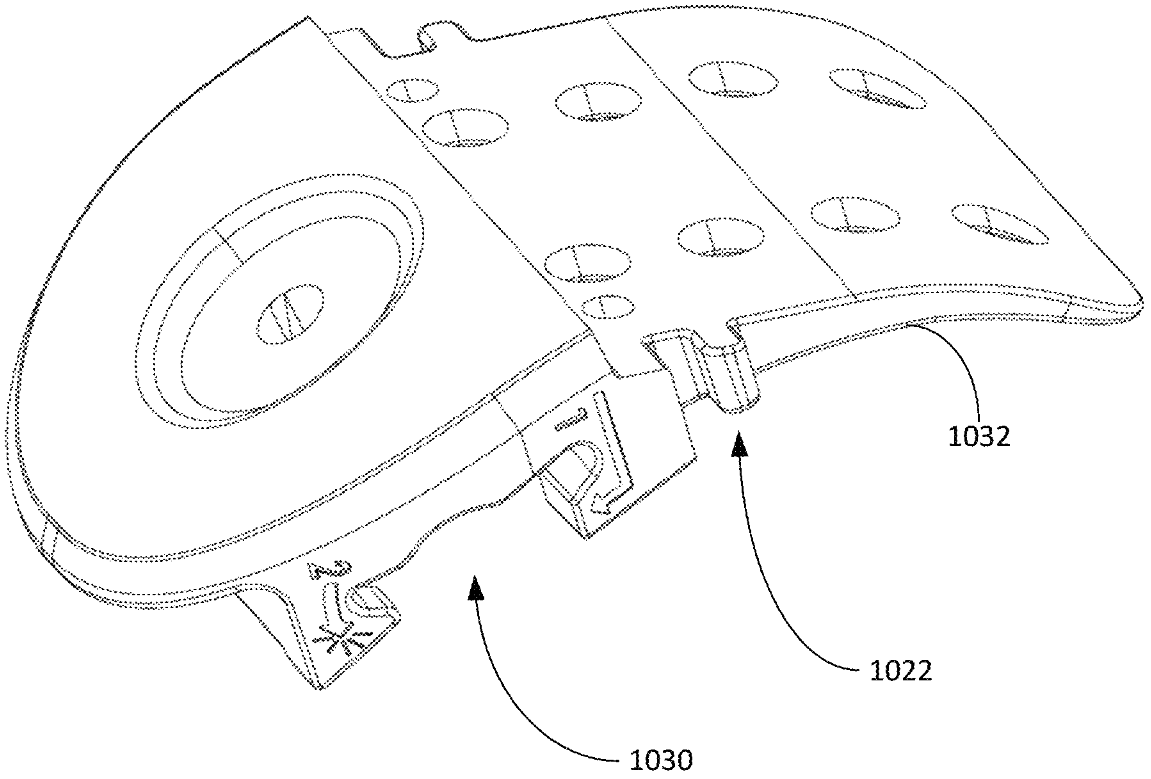
FIG. 6 is a top perspective view of a support element of the arm band of FIG. 5.
Figure 7:
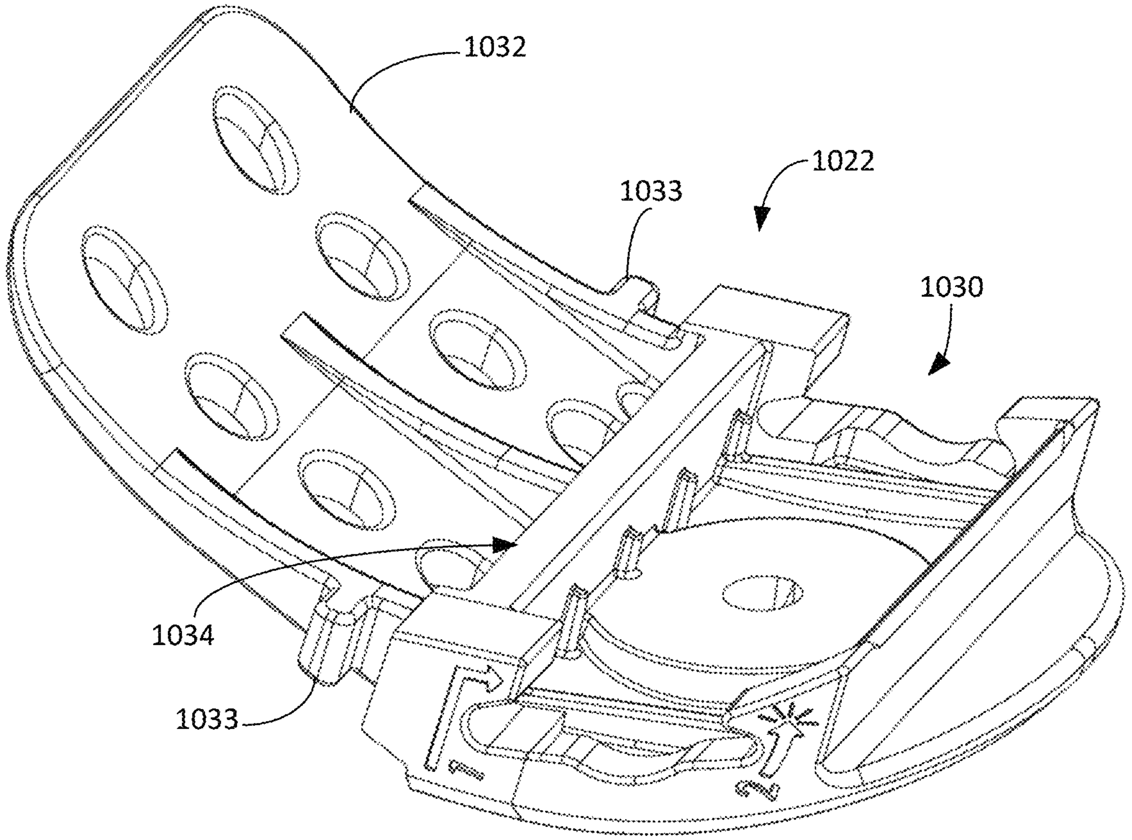
FIG. 7 is a bottom perspective view of the support element of the arm band of FIG. 5.

The cradle 1012 may optionally be equipped with one or more arm bands 1024 to help the user maintain his arm within the cradle 1012. As shown in FIG. 5, each arm band 1024 includes a fastening mechanism 1022 and a flexible strap 1026. With reference to FIGS. 6-7, the fastening mechanism 1022 includes a notch 1030 and a support arm 1032. The flexible strap 1026 slides onto the support arm 1032 until it abuts a back wall 1034 of the support arm 1032. Wings 1033 prevent the flexible strap 1026 from sliding off of the support arm 1032. In embodiments, the arm band(s) 1024 engage with a rail 1022 on the cradle 1012 which receives the arm band(s) 1024 and allows for easy adjustment of the arm band(s) 1024. More particularly, the notch 1030 of the arm band 1024 snaps onto the rail 1022 on the cradle at a user's desired location along the rail 1022. As shown in the figures, a rail 1022 is provided on both sides of the cradle 1012. An arm band 1024 may be attached to one or both of the rails 1022 as desired by the user. Once in position, the arm band 1024 extends across the cradle 1012 to keep the user's arm in the cradle 1012 during use. The arm band 1024 may be made of a material that is strong enough to maintain the user's arm within the cradle 1012, yet flexible enough to allow the user to break free of the cradle 1012 as necessary or desired.

Figure 9:
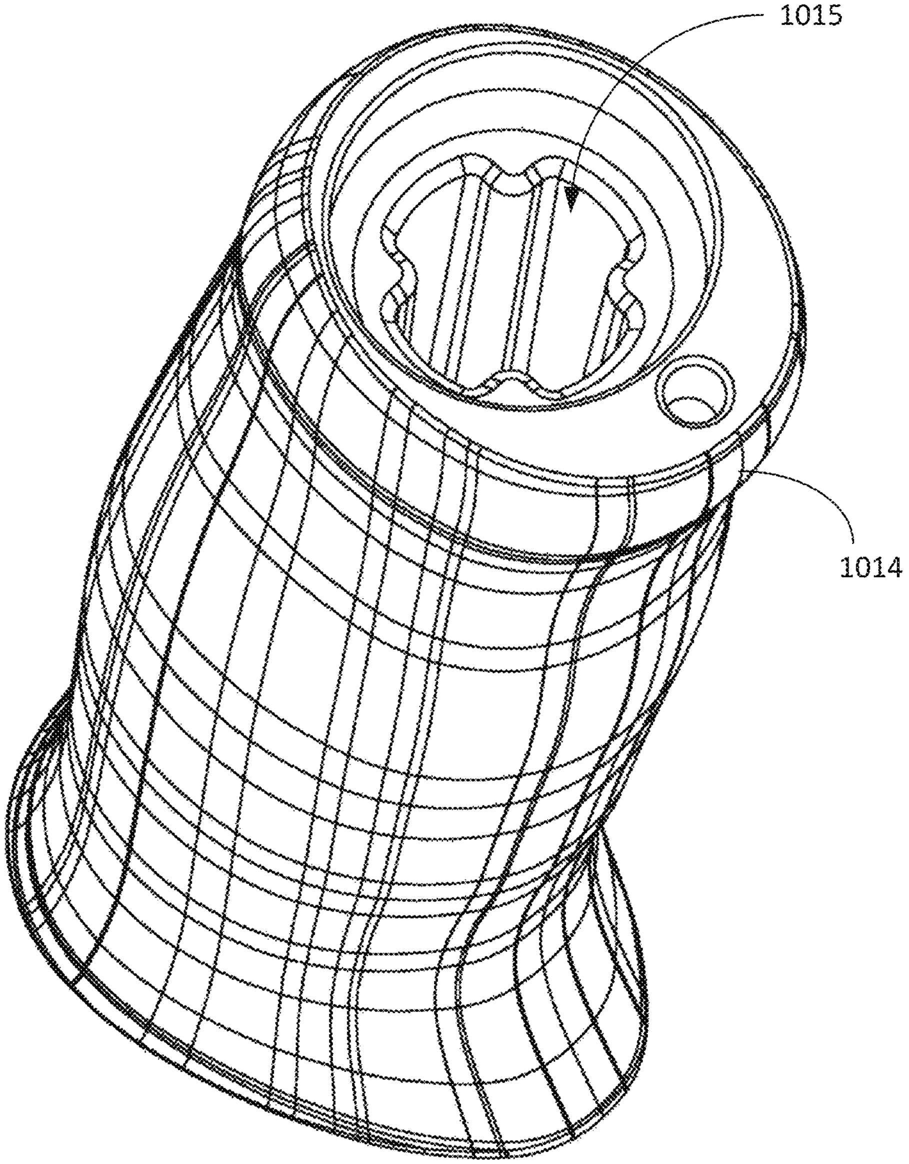
FIG. 9 is a perspective view of a handle of the reclined crutch of FIG. 1.

Moving on, with reference again to FIG. 8B and to FIG. 9, a handle support 1014S may extend from the second section 1007 of the leg 1002. A handle 1014, which may be ergonomically designed, may fit over the handle support 1014S. The handle 1014 may have a cavity 1015 shaped to mate with the handle support 1014S. In the figures, the handle support 1014S is configured in a cross shape, with the handle 1014 having a corresponding cross shaped cavity 1015. In embodiments, the handle 1014 may be rotatable from side to side and may be locked into a desirable position that is most comfortable for the user. Additionally, the handle 1014 may optionally be interchangeable.

A foot 1010 is secured to a bottom end of the first section 1008 to provide cushion and traction when walking with the crutch 1000. Any foot now known or later developed may be utilized. Thus, it will be understood to those of skill in the art that the foot 1010 may be interchangeable with another foot as desired by the user or as necessary (e.g., when the foot 1010 wears out).

Figure 11:
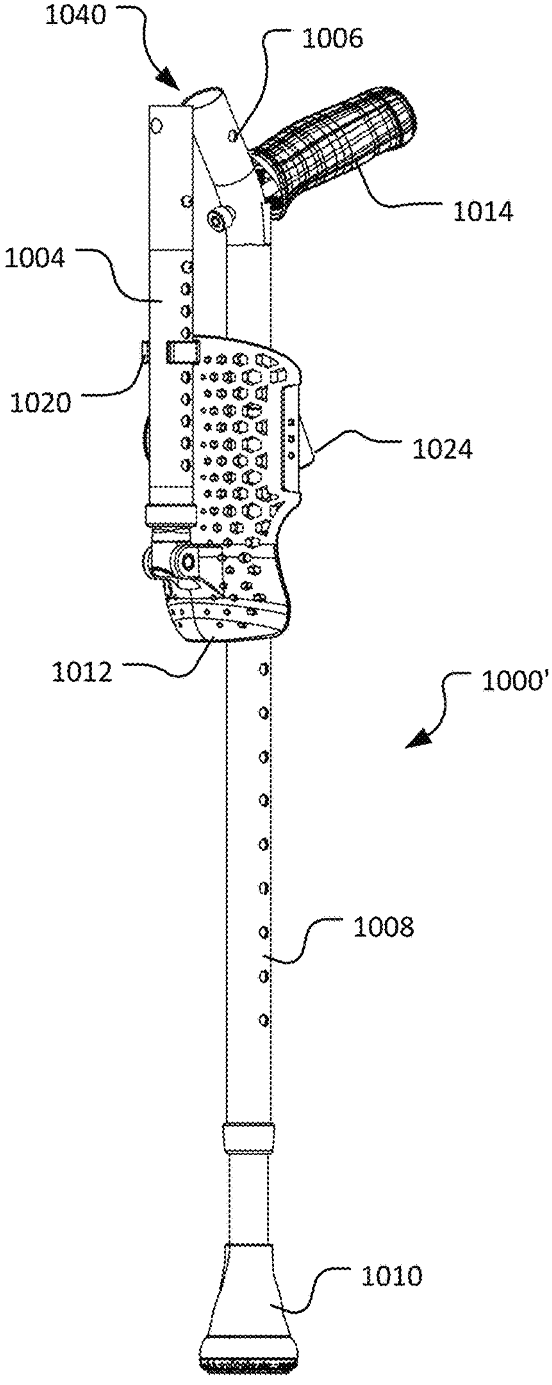
FIG. 11 is a perspective view of the reclined crutch of FIG. 1 in an alternative configuration.
Figure 12:
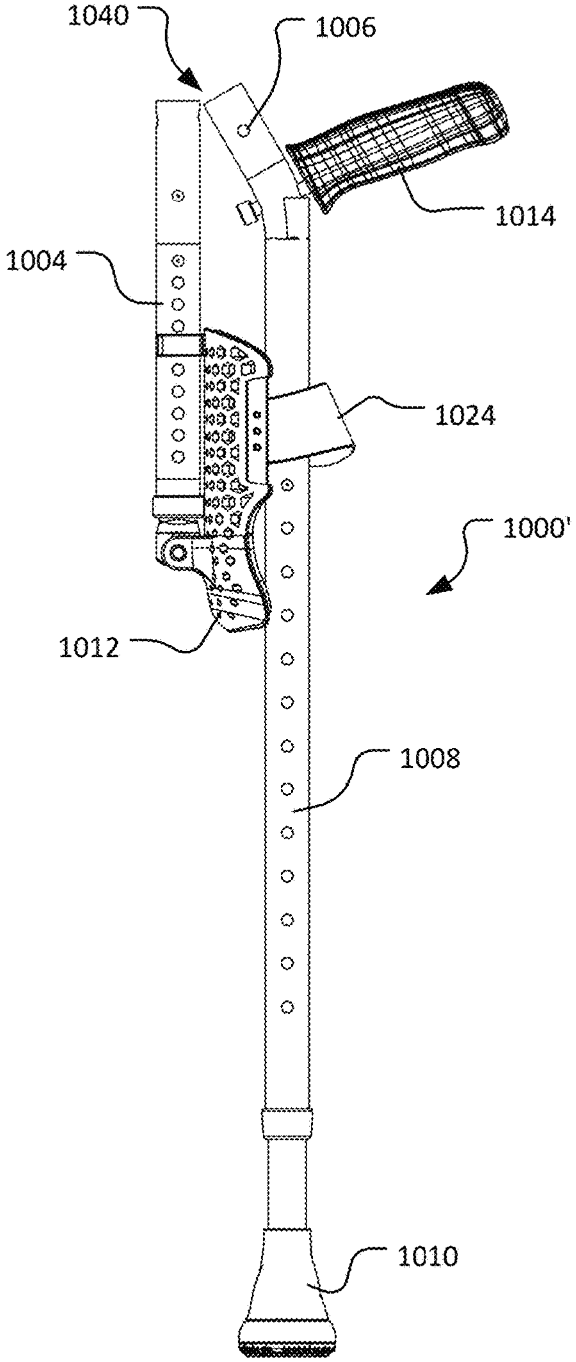
FIG. 12 is another perspective view of the reclined crutch of FIG. 1 in the alternative configuration.
Figure 13:
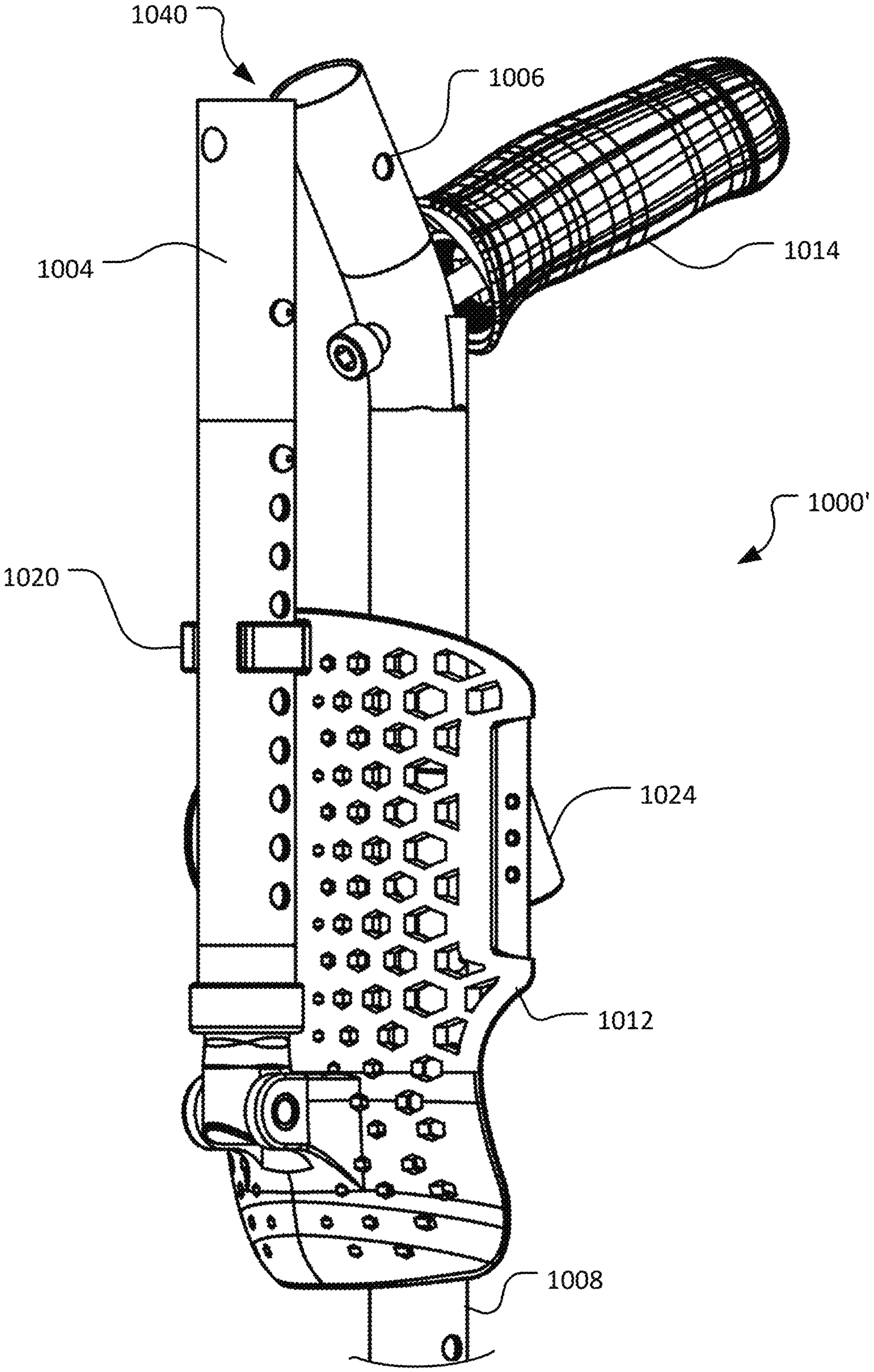
FIG. 13 is a close-up view of the top portion of the reclined crutch of FIG. 1 in the alternative configuration.
Figure 14:
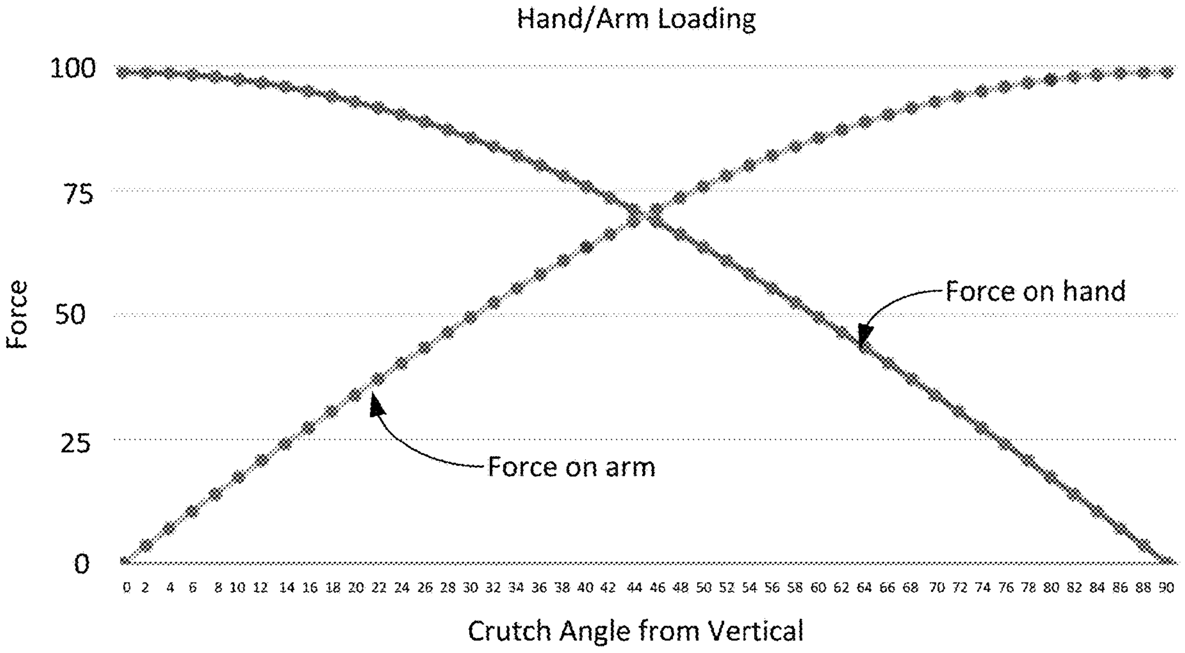
FIG. 14 is a graph illustrating the loading force on the hand/arm of a user of a crutch at varying crutch angles relative to vertical.

In embodiments, the crutch 1000 may be designed to be selectively reconfigured as a cane. FIGS. 11-13 illustrate the reconfigured cane 1000'. The cane 1000' is substantially the same as the crutch 1000. To reconfigure as a cane, the third section 1004 is disconnected from the second section 1006 and folded about a pivot point 1040 such that the surface of the cradle 1012 rests substantially against the first section 1008 of the leg 1002. The arm band 1024 may be wrapped around the first section 1008 to keep the cradle 1012 in the cane position against the leg 1002. In embodiment, a clip or other mechanical component may be used to secure the third section 1004 to the first section 1008. Once the cradle 1012 is in position against the leg 1002, the user may utilize the cane 1000' as traditionally understood, e.g., by holding onto the handle 1014 for support.

Preferably, the third section 1008 maintains a point of connection with the second section 1006. For example, a string connected to both the second section 1006 and the third section 1008 may provide such a point of connection. Or, in embodiments, a hinge may be provided at the pivot point 1040 to allow the third section 1008 to rotate down into the cane position as described above. Other means of providing a point of connection may alternately or additionally be used as will be understood by those of skill in the art.

From the cane position, the third section 1004 may simply be rotated upwards such that the end opposite the cradle 1012 is received back into the top 1006T of the second section 1006. The third section 1004 may be locked into position (e.g., via a quick-release system), and the cane 1000' is thereby reconfigured again as the forearm crutch 1000.

As is known to those of skill in the art, the height of the crutch 1000 or cane 1000' can be adjusted based on the height of the user. In embodiments, both the first section 1008 and the third section 1004 section may be lengthened or shortened as desired. While any method of extending the length of any of the sections 1004, 1006, 1008 may be used, in embodiments, quick-release pins and corresponding holes in the respective sections 1004, 1006, 1008 may allow for easily adjust the length of the desired section 1004, 1006, and/or 1008.

Many different arrangements of the various components depicted, as well as components not shown, are possible without depart from the spirit and scope of the invention. Embodiments of the invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the invention. Further, it will be understood that certain features and subcombinations are of utility and may be employed within the scope of the disclosure. Further, various steps set forth herein may be carried out in orders that differ from those set forth herein without departing from the scope of the claimed methods. This specification shall not be restricted to the above embodiments. Any units of measurement provided herein are exemplary only and are not meant to specifically define the dimensions of the system. Other dimensions may be appropriate or desirable.

The invention claimed is:

1. A reclined forearm crutch, comprising:

a leg comprising a first section operably coupled to a second section; and a cradle attached to the second section of the leg for supporting the forearm and elbow of a user, the cradle comprising an elbow end comprising an elbow cup and a wrist end spatially separated from the elbow end thereby defining a cradle length;

wherein:

the cradle is selectively adjustable between a walking position and a non-walking position; and in the walking position, the cradle is angled about 5 to about 50 degrees relative to vertical; wherein, the cradle is attached to the leg at the elbow end, and a portion of the length of the cradle between the elbow end and the wrist end rests substantially adjacent the leg in the walking position, the elbow end of the cradle extending beyond an end of the leg, and the second section of the leg is configured to selectively decouple from the first section of the leg and rotate about a pivot point at a top end of the first section such that an arm-receiving surface of the cradle defined by the length thereof rests substantially adjacent the first section, whereby the forearm crutch is reconfigured for use as a cane.

2. The crutch of claim 1, wherein the cradle further comprises a clip at the wrist end, the clip securing the wrist end of the cradle to the leg in the walking position.

3. The crutch of claim 2, wherein:

the cradle is hingedly attached to the leg at the elbow end; and in the non-walking position, the cradle is selectively free-rotating.

4. The crutch of claim 3, wherein the cradle is selectively lockable in a substantially horizontal position to enable a platform walking position, wherein an angle of the cradle in the substantially horizontal position is between 5 and 12 degrees relative to horizontal.

5. The crutch of claim 1, further comprising a handle extending from the leg.

6. The crutch of claim 1, wherein the pivot point comprises a point of connection between the first section and the second section.

7. The crutch of claim 6, wherein the point of connection is a string or a hinge.

8. The crutch of claim 1, wherein a length of the second section is adjustable based on the length of the user's forearm.

9. The crutch of claim 1, wherein an angle of the cradle in the walking position is about 8 to about 35 degrees relative to vertical.

10. The crutch of claim 1, wherein the cradle comprises a plurality of apertures formed therein.

11. A forearm crutch, comprising:

a leg comprising a first section operably coupled to a second section;

a cradle comprising an elbow end having an elbow cup for supporting a user's elbow and a wrist end spatially separated from the elbow end thereby defining a length of the cradle, wherein:

the elbow end of the cradle is hingedly attached to the second section of the leg; and the wrist end comprises a clip configured to selectively secure the wrist end to the leg; and the cradle is configured to rotate about the hinge between a use-position and a free-rotating position; and in the use position, the clip engages with the leg such that substantially all of the length of the cradle rests substantially adjacent the leg; and a handle extending from the leg wherein, the second section of the leg is configured to selectively decouple from the first section and rotate about a pivot point at a top end of the first section such that a top surface of the cradle rests substantially adjacent the first section, whereby the forearm crutch is reconfigured for use as a cane.

12. The crutch of claim 11, wherein the pivot point comprises a point of connection between the second and third sections, the point of connection being a string or a hinge.

13. The crutch of claim 11, wherein the cradle comprises a plurality of apertures formed therein.

14. The crutch of claim 11, wherein the second section is angled about 35 degrees relative to vertical.

15. The crutch of claim 11, wherein the second section is a telescoping member.

* * * * *